US012549912B2

(12) United States Patent
Marie De Chastenay

(10) Patent No.: US 12,549,912 B2
(45) Date of Patent: Feb. 10, 2026

(54) BONE CONDUCTION HEARING AID

(71) Applicant: SOUNDUCT, Strasbourg (FR)

(72) Inventor: Jean-Philippe Marie De Chastenay, Strasbourg (FR)

(73) Assignee: SOUNDUCT (FR)

( * ) Notice: Subject to any disclaimer, the term of this patent is extended or adjusted under 35 U.S.C. 154(b) by 148 days.

(21) Appl. No.: 18/562,440

(22) PCT Filed: May 19, 2022

(86) PCT No.: PCT/EP2022/063662

§ 371 (c)(1), (2) Date: Nov. 20, 2023

(87) PCT Pub. No.: WO2022/243489

PCT Pub. Date: Nov. 24, 2022

(65) Prior Publication Data

US 2024/0244385 A1 Jul. 18, 2024

(30) Foreign Application Priority Data

May 20, 2021 (FR) ....................................... 2105313

(51) Int. Cl.
*H04R 25/00* (2006.01)
*H04R 1/08* (2006.01)

(52) U.S. Cl.
CPC ............ *H04R 25/606* (2013.01); *H04R 1/08* (2013.01); *H04R 2225/021* (2013.01); *H04R 2460/13* (2013.01)

(58) Field of Classification Search
CPC .. H04R 25/606; H04R 1/08; H04R 2225/021; H04R 2460/13
USPC .......................................................... 381/312
See application file for complete search history.

(56) References Cited

U.S. PATENT DOCUMENTS 10,419,843 B1 9/2019 Mehra et al.
2008/0112581 A1 5/2008 Kim et al.

FOREIGN PATENT DOCUMENTS

CN 208821090 U 5/2019
WO WO-2009101622 A2 * 8/2009 ............. H04S 7/301

* cited by examiner

*Primary Examiner* — Sean H Nguyen
(74) *Attorney, Agent, or Firm* — Lerner David LLP

(57) ABSTRACT

The invention relates to a hearing aid intended to be placed around an ear of a user, characterised in that it comprises at least one first bone conduction device and at least one second bone conduction device, the first device being configured to be positioned in contact with a first bone area of the user's head and to transmit first vibrations to said first bone area, and the second device being configured to be positioned in contact with a second area of the user's head and to transmit second vibrations to said second bone area, said second area being different from the first area, and said first bone area and said second bone area being located around the same ear of the user, said hearing aid further comprising at least one microphone for picking up an ambient sound signal which is then transformed to generate the first and second vibrations.

20 Claims, 3 Drawing Sheets

BONE CONDUCTION HEARING AID

CROSS-REFERENCE TO RELATED APPLICATIONS

The present application is a national phase entry under 35 U.S.C. § 371 of International Application No. PCT/EP2022/063662 filed May 19, 2022, which claims priority from French Application No. 2105313 filed May 20, 2021, all of which are incorporated herein by reference.

The present invention relates to a hearing aid comprising at least a first and at least a second bone conduction device, a hearing system including two hearing aids, as well as a method for listening to a sound signal by means of said hearing aid or said hearing system. The invention also relates to a hearing aid and a hearing system for use in the treatment of hearing impairment and deafness.

Deafness or hearing impairment affects hundreds of millions of people around the world. Most hearing aids capture surrounding sounds, process them and then reproduce the signal obtained in acoustic form in the ear canal of the user.

This type of aids through air conduction of the sound has several drawbacks. On the one hand, the sound reproduced in the ear canal is not always of good quality, particularly when the user is in a noisy place, which gives the user a feeling of "hubbub". On the other hand, the sound is conventionally reproduced in the ear canal of a hearing system that is by definition defective, which limits the effectiveness of this type of hearing aids. Furthermore, inserting a hearing aid into the ear canal generates invasive pressure on the eardrum. Finally, depending on the pathology, such as when a person does not have an ear canal, this type of hearing aid is useless.

In the case of severe hearing impairments or deafness, it is possible to equip people with a cochlear implant. Such a hearing aid includes an outer part and an inner part surgically fixed in the skull. The outer part of the implant makes it possible to capture and transform the surrounding sounds into electrical signals which are transmitted to the inner part of the implant. The inner part of the implant then emits electrical impulses transmitted to the cochlea which then induces stimulation of the fibers of the auditory nerve.

However, the effectiveness of the cochlear implants remains limited for a conversation in a noisy environment or for the perception of music. Moreover, the implantation of these hearing aids requires a very invasive surgical operation and then a training with professionals, which does not make them accessible to everyone. Finally, for some types of pathologies, cochlear implants are also ineffective.

There is therefore a need to develop a non-invasive hearing solution, easy to use and set up, and which allows hearing-impaired or deaf persons to hear surrounding sounds with optimized and natural quality, and this, whatever the location and ambient noise and whatever the user's pathology.

The object of the invention is thus a hearing aid intended to be disposed around a user's ear, said hearing aid comprising at least a first bone conduction device and at least a second bone conduction device, the first device being configured to be positioned in contact with a first bone area of the user's head and to transmit first vibrations to said first bone area, and the second device being configured to be positioned in contact with a second area of the user's head and to transmit second vibrations to said second bone area, said second area being different from the first area, and said first bone area and said second bone area being located around the same ear of the user, said hearing aid further comprising at least one microphone making it possible to capture a surrounding sound signal which is then transformed to generate the first and second vibrations.

The aforementioned hearing aid makes it possible to stimulate by bone conduction the auditory nerve of the ear around which the hearing aid is positioned, by means of the first and second vibrations transmitted by the first and second bone conduction devices. The first and second vibrations thus reach directly the same auditory nerve (that of the ear around which the hearing aid is positioned) via the crossed bone material, without any loss of signal. A user wearing said hearing aid thus obtains an improved reproduction of the sound signal compared to the reproduction of the signal by hearing aids of the prior art.

In the present description, when it is said that acoustic waves reach or stimulate the auditory nerve, this refers to the auditory nerve (or vestibulo-cochlear nerve) and/or to the cochlea.

In the invention, a bone conduction device is a device which converts a sound signal (or sound waves) into vibrations which are transmitted by the bone(s) with which the device is in (direct or indirect) contact, preferably as far as the auditory nerve. Particularly, the hearing aid includes at least one microphone which receives a surrounding sound signal, that is to say sound waves transmitted by the surrounding environment, such as for example the words of a person, music or surrounding noises, which transforms this sound signal into an electrical signal, said electrical signal then being transformed, by means of a transducer, into acoustic vibrations (or vibrations).

The microphone can be any type of microphone and, preferably, a MEMS (Micro Electro Mechanical System) type microphone.

Preferably, the microphone can capture frequency ranges going at least from 200 Hz to 20 KHz which corresponds to the frequency ranges of the hearing spectrum, and can capture frequency ranges also going beyond this range.

Moreover, the dynamic range of the microphone can range from 75 dB to 115 dB, preferably from 85 dB to 105 dB, and more preferably from 90 dB to 100 dB.

Concerning the directivity, the microphone can be omnidirectional, cardioid, super-cardioid, hypercardioid, cannon or bi-directional. Preferably, the microphone can be omnidirectional so that it can capture a large part of the surrounding sounds.

When the hearing aid includes a single microphone, a single electrical signal is transmitted to the first and second bone conduction devices, which allows said devices to transmit first and second vibrations having identical characteristics.

Advantageously, the first and second vibrations being transmitted essentially by bone material, particularly by the bone material comprised between, on the one hand, the first bone area and the auditory nerve and, on the other hand, the second bone area and the auditory nerve, the auditory nerve is stimulated even when the different elements/constituents of the auditory system, such as for example the eardrum or the cochlea, are damaged. In addition, the transmission mode makes it possible not to use elements of the hearing system that would be already weakened and, for example, not to send a sound signal to an already defective eardrum.

The auditory nerve includes several areas and in particular a central area receiving the acoustic vibrations from medium to very low frequencies (low-pitched sounds) and a peripheral area receiving the acoustic vibrations from medium to very high frequencies (high-pitched sounds). In other words, the lower frequencies the acoustic vibrations have, the deeper they penetrate into the auditory nerve.

Preferably, the first and/or the second bone area(s) can be predefined so as to obtain optimal stimulation of the auditory nerve. The first and/or the second bone area(s) can in particular be defined according to the morphology of the ear and/or of the bones of the user's head so that the device positioned on the first bone area transmits first acoustic vibrations preferentially, or even solely, to a first part of the auditory nerve and that the device positioned on the second bone area transmits second acoustic vibrations preferentially, or even solely, to a second part of the auditory nerve, the second part being different from the first part. Thus, the hearing aid can be personalized according to the particularities of each user. The first part of the auditory nerve can in particular be a central area of said auditory nerve and the second part of the auditory nerve can be a peripheral area of said auditory nerve.

The first bone area can be part of the cranium and/or of the jaw. Moreover, the second bone area can be part of the cranium and/or of the jaw.

Advantageously, the first and second bone areas being different, the first and second vibrations come from two different areas and can thus stimulate two different parts of the auditory nerve which allows optimized transmission of the sound signal received by the microphone(s). Indeed, the auditory nerve is formed of a plurality of hair fibers that receive different vibration frequencies. Particularly, the fibers located at the beginning of the cochlea (on the outer base) receive the high-pitched frequencies, and those located at the inner end of the spiral (towards the apex) receive the low-pitched frequencies. Thus, the fact of being able to stimulate different parts of the auditory nerve makes it possible to select, refine and increase the range of frequencies received by the auditory nerve and therefore to improve the sound quality and variations heard by the user.

Particularly, the hearing spectrum comprises the following frequency ranges: very low frequencies (20 Hz to 40 Hz), low frequencies (40 Hz to 160 Hz), medium-low frequencies (160 Hz to 315 Hz), medium frequencies (315 Hz to 2.5 kHz), medium-high frequencies (2.5 kHz to 5 kHz), high frequencies (5 kHz to 10 kHz), and very high frequencies (10 kHz to 20 kHz). The auditory nerve and in particular all the hair fibers receive all the frequency ranges of the auditory spectrum.

According to particular embodiments taken alone or in combination:

- the hearing aid can include at least two microphones; the two microphones make it possible to capture surrounding sounds in an optimized manner; according to one preferred variant of this embodiment, the two microphones can have different orientations and capture different and complementary sound signals; the sound signals captured by the two microphones are transformed into electrical signals by each of the microphones and the resulting electrical signals are then superimposed by a processor to form a global electrical signal which is then transmitted to the first and second transducers; according to a second variant of this embodiment, the two microphones can be oriented identically and capture an identical sound signal; the sound signals captured by the two microphones are then superimposed as described for the preferred variant;
- the first bone conduction device can comprise a first transducer and the second bone conduction device can comprise a second transducer, the first and second transducers making it possible to transform an electrical signal coming from the sound signal into first and second acoustic vibrations;
- the microphone(s) make it possible to generate at least one electrical signal from said at least one sound signal and the hearing aid comprises a processing module making it possible to process said at least one electrical signal; the processing module can comprise at least one microprocessor making it possible to digitize the electrical signal received, and possibly to process said signal in particular by filtering, compression, feedback suppression, improvement of the signal-to-noise ratio, etc;
- the first and second devices can be positioned on the user's skin and the hearing aid can include a system for holding the first and second devices on the skin; the holding system advantageously ensures that the first and/or the second device(s) is(are) held in a predefined optimal position, despite possible movements of the user; thus, the user can wear the hearing aid in their various daily activities and even during sports activities, without any loss of perception of sound; the holding system can comprise for example an adhesive for holding the first and/or the second device(s) on the skin, a rigid or flexible hoop closely matching at least part of the contour of the ear or of the head and including the first and/or the second device(s), and/or a hearing headset in which the first and/or the second device(s) is(are) integrated;
- the hearing aid can further comprise a connecting device making it possible to connect the first and second devices to each other; the connecting device makes it possible to create an electrical and/or mechanical connection between the first and the second devices; in the case of a mechanical connection, the connecting device can be for example a rigid or flexible hoop matching at least part of the contour of the ear or of the head, a hearing headset in which the first and/or the second device(s), or even a flexible cable is(are) integrated; in the case of an electrical connection, it may be a wired or wireless connection which may possibly be integrated into the mechanical connecting device; the electrical connection can for example be made via a central unit comprising in particular the processing module; according to one preferred embodiment, the connecting device can connect the first and second devices to each other via the central unit; and
- the hearing aid can further comprise at least one electrical signal receiver; the electrical signal receiver can for example receive an electrical signal coming from a music player or a telephone; according to one possible embodiment, said at least one receiver can for example be integrated into the holding device and/or into the connecting device, or be integrated into a complementary unit which can be for example a rigid or flexible neck strap, or a portable casing, the complementary unit being able to be connected in wired or wireless form to the first and/or second bone conduction device(s).

The invention also relates to a method for listening to a sound signal by means of the aforementioned hearing aid, said method comprising the following steps:

- positioning the first bone conduction device in contact with a first bone area of the user's head,
- positioning the second bone conduction device in contact with a second bone area of the user's head, the second bone area being different from the first bone area, and the first and second bone areas being located around the same ear, transmitting first vibrations from the first device and second vibrations from the second device, so as to stimulate the auditory nerve of said ear.

Advantageously, the method makes it possible to stimulate, by means of two bone conduction devices positioned at precise points of the user's anatomy, two different parts of the auditory nerve. Thus, the method makes it possible to reproduce for the user the entire hearing spectrum unlike a hearing aid that would use a single bone conduction point.

In the present invention, when it is indicated that a bone conduction device is positioned around the ear, this means that it is positioned in contact with bone parts located around said ear, and this, preferably at most 3 cm from a point around the ear to which it is closest, preferably at most 2 cm. However, for users with an atypical morphology, the bone conduction device can be positioned at a greater distance from the ear, for example at the level of the temple bone.

Moreover, in the present invention, when it is indicated that a device is in contact with a bone area, this means that the device is in direct or indirect contact with said bone area, and this, in an accurate point of contact. The indirect contact may for example be a contact via the skin and the tissues located between the skin and the bone area.

The positioning of the first and second bone conduction devices on the skin is carried out according to the morphology of the user and so that the vibrations optimally reach the auditory nerve. Advantageously, the first and second bone conduction devices are easily movable around the ear so as to be able to position the hearing aid in a personalized manner for each user by adapting to the anatomy of the latter.

According to particular embodiments taken alone or in combination:

- the first device can be positioned behind the ear and the second device can be positioned in front of the ear so that the first vibrations reach a central area of the auditory nerve and that the second vibrations reach a peripheral area of the auditory nerve; thus, the stimulation of the auditory nerve is optimized, particularly because the stimulation from the back of the ear allows greater stimulation of the auditory nerve; indeed, the auditory nerve makes more extensive contact with the skull bone positioned behind the ear and it is therefore stimulated to a greater extent by the second device placed behind the ear; moreover, the stimulation carried out by the back of the ear and the one carried out by the front of the ear are complementary and allow optimized sound reproduction for the user, in particular because the sound reproduction thus covers all the wavelengths of the hearing spectrum;
- the first and/or the second bone areas is(are) chosen so as to be able to transmit the determined frequency ranges to the user; thus, the positioning of the first and second devices can be adapted to the needs of the user and also to their morphology; advantageously, it is thus possible to transmit the entirety of the frequencies of the hearing spectrum or to favor some frequencies according to the degree of hearing impairment of the user;
- the first device can be positioned in contact with the temporal bone, and preferably in contact with the mastoid process of the temporal bone; advantageously, the mastoid process of the temporal bone makes extensive contact with the auditory nerve and the first vibrations transmitted by this part of the temporal bone thus stimulate an extended part of the auditory nerve; moreover, the mastoid process of the temporal bone preferably transmits frequencies ranging from very low to medium; and
- the second device can be positioned in contact with the temporal bone and/or the mandible; when the second device is in contact with the temporal bone, it is preferably in the vicinity of the temporomandibular joint, namely for example at 3 cm at most from said joint and preferably at 2 cm at most; the temporal bone preferably transmits frequencies ranging from medium-low to very high.

The invention also relates to a hearing system including a first and a second hearing aid such as the aforementioned hearing aid, the first hearing aid being configured to be positioned around an ear of the user and the second hearing aid being configured to be positioned around the other ear of said user.

The hearing systems according to the invention make it possible to equip both ears of a user, thus improving the perception of sound. In case the hearing system is used by a hearing-impaired person, the perception of surrounding sounds is complete and optimal. In the case where the hearing system is used for example for a conversation with a third person, or to listen to music, the hearing system allows the user to have stereo sound.

The invention also relates to a hearing aid for use in the treatment of hearing impairment and deafness, said hearing aid comprising at least a first bone conduction device and at least a second bone conduction device, the first device being configured to be positioned in contact with a first bone area of the user's head and to transmit first vibrations to said first bone area, and the second device being configured to be positioned in contact with a second area of the user's head and to transmit second vibrations to said second bone area, said second area being different from the first area, and said first bone area and said second bone area being located around the same ear of the user, said hearing aid further comprising at least one microphone making it possible to capture a surrounding sound signal which is then transformed to generate the first and second vibrations.

According to one preferred embodiment, the hearing aid can be such as the one described according to the first object of the invention.

The hearing impairment is defined as a partial loss of the hearing, in particular a loss of hearing ability of at least 10 dB, preferably at least 20 dB and/or a loss of hearing ability for some frequencies of the auditory spectrum. Deafness is defined as a total loss of hearing.

The pathologies which can be treated by the hearing aid according to the invention are in particular chosen from congenital or acquired pathologies of deafness or hearing impairment such as mixed pathologies, transmission pathologies, aplasia, absence of an ear canal, altitude, diving, decompression accidents, ear infections, viruses, unilateral cophosis, neurosensory pathologies, presbycusis, cases of neuromas and acoustic blast.

BRIEF DESCRIPTION OF THE DRAWINGS

Other characteristics and advantages of the present invention will appear in the light of the description of non-limiting examples of hearing aids or hearing systems according to the invention made with reference to the figures.

In the Appended Drawings.

DESCRIPTION OF THE EMBODIMENTS

For reasons of clarity, only the elements essential for understanding the invention have been schematically represented, without meeting the scale.

Figure 1A:
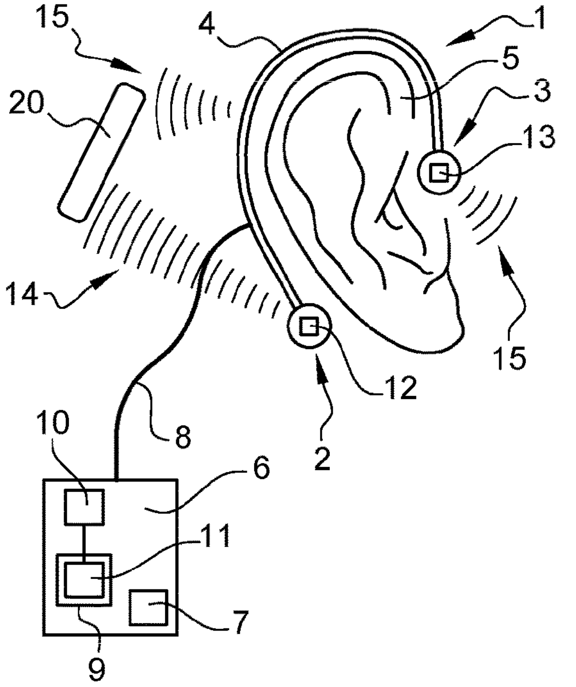
FIG. 1*a* represents a schematic front view of a hearing aid according to a first variant of a first embodiment positioned around the ear of a user.

FIG. 1 illustrates a hearing aid 1 according to a first embodiment of the invention positioned around an ear 5 of a user. The user is, in this embodiment, a hearing-impaired person.

The hearing aid 1 includes a first bone conduction device 2 as well as a second bone conduction device 3. The first bone conduction device 2 is positioned behind the ear 5, in contact with the mastoid process of the temporal bone and the second bone conduction device 3 is positioned in front of the ear 5 in contact with the temporal bone, in the vicinity of the temporomandibular joint. However, depending on the user's morphology, the first and/or the second device(s) can be positioned in contact with another bone, for example in contact with the temple, so as to ensure optimized stimulation of the auditory nerve.

The hearing aid 1 also includes a central unit 6 which includes a microphone 10 making it possible to capture a surrounding sound signal and to convert it into an electrical signal. The central unit 6 further includes a processing module 9 making it possible to process the electrical signal coming from the microphone 10. The processing module 9 includes in particular a microprocessor 12 which is connected to the microphone 10 and which makes it possible to process the electrical signal coming from the microphone 10 for example by filtering, compression, feedback suppression or even improvement of the signal-to-noise ratio, so as to form an improved electrical signal.

The processing module can also include other elements such as for example an artificial intelligence module making it possible to process the signal in real time, or sensory sensors.

The central unit 6 also includes a battery 7 making it possible to electrically power the hearing aid 1. In this embodiment, the central unit 6 is at a distance from the first and second bone conduction devices and is carried by the user for example around the neck.

The hearing aid 1 also includes a first electromechanical transducer 12 positioned in the first bone conduction device 2 and a second electromechanical transducer 13 positioned in the second bone conduction device 3.

The improved sound signal generated by the microprocessor 11 is transmitted via a first electrical cable to the first transducer 12 and via a second electrical cable to the second transducer 13. The first electrical cable and the second electrical cable pass through the secondary cable 8 then separate and connect respectively to the first transducer 12 and to the second transducer 13 via the primary cable 4. From the improved sound signal, the first transducer 12 thus generates first vibrations 14 and the second transducer generates second vibrations 15, the vibrations 14 and 15 then being transmitted to the auditory nerve (not represented) through the bone on which the first and second devices are positioned.

The first and second transducers 2 and 3 being positioned around the same ear 5, the first and second vibrations 14 and 15 stimulate the same auditory nerve 20, namely the auditory nerve of the ear 5, which allows the user to perceive improved sound compared to the hearing aids of the prior art.

In this embodiment, the first bone conduction device 2 is positioned in contact with the mastoid process of the temporal bone and the second bone conduction device 3 is positioned in contact with the temporal bone. The user thus receives a complete reproduction of the surrounding sound since all the wavelengths of the auditory spectrum reach the auditory nerve.

Figure 1B:
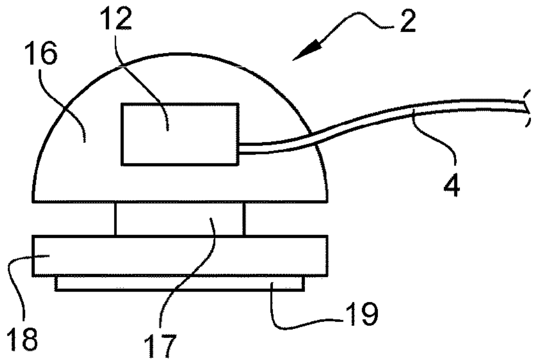
FIG. 1*b* represents a schematic sectional view of the first device of the hearing aid of FIG. 1*a;*

FIG. 1*b* illustrates an enlarged view of the first device 2. The first device 2 includes a main body 16 in the shape of a half-sphere in which the first transducer 12 is placed. The first transducer 12 is connected to the first electrical cable positioned in the primary cable 4 through which it receives the improved sound signal.

The first device 12 also includes a positioning base 18 to which a holding system 19 which is in this embodiment an adhesive, is fixed. The first device 2 also includes an intermediate part 17 which makes it possible to connect the main body 16 and the base 18 so that the main body 16 and the base 18 can move relative to each other while remaining secured to each other.

Figure 1C:
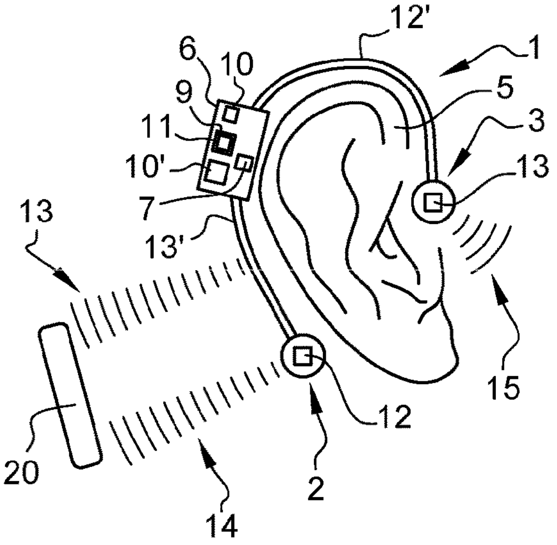
FIG. 1*c* represents a schematic front view of a hearing aid according to a second variant of a first embodiment positioned around the ear of a user.

FIG. 1*c* illustrates a hearing aid according to a second variant of the first embodiment. In this second variant, the central unit 6 is small and positioned behind the user's ear.

The central unit 6 includes a first microphone 10 and a second microphone 10' which are omnidirectional and of the MEMS type. The first microphone 10 is oriented towards the front of the user and the second microphone 10' is oriented towards the back of the user. Thus, the first and second microphones 10 and 10' capture different and complementary sound signals.

The central unit 6 also includes a processing module 9 comprising, as in the first variant, a processor 11. In this second variant, the processor 11 makes it possible to superimpose the electrical signals coming from the first and second microphones 10 and 10' in order to form a global electrical signal which is then transmitted to the first and second transducers 12 and 13.

In this second variant, the first and second transducers 12 and 13 are each connected directly to the processing module 9 via a first electrical cable 12' and a second electrical cable 13'.

In this second variant, the first bone conduction device 2 and 3 are identical to those described in the first variant and are positioned around the user's ear as described for the first variant.

According to this second variant, the hearing aid is more compact and less bulky and therefore more convenient to use. Moreover, the two microphones being positioned near the ear and being oriented differently, the hearing aid very realistically reproduces the sound normally perceived by the ear.

Figure 2A:
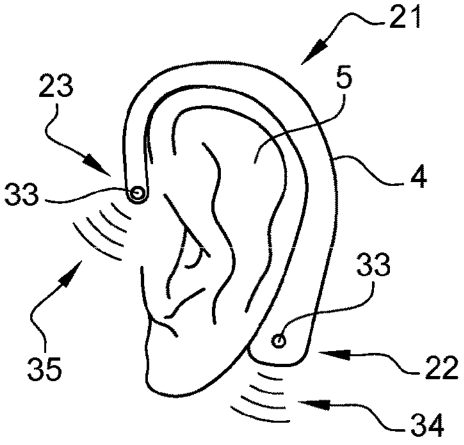
FIG. 2*a* represents a schematic front view of a hearing aid according to a second embodiment positioned around the ear of a user.

FIG. 2*a* illustrates a hearing aid 21 according to a second embodiment. The hearing aid 21 includes a first bone conduction device 22 and a second bone conduction device 23.

The first and second devices 22 and 23 are connected to each other by a connecting device 4 which also serves as a system for holding the first and second devices 22 and 23. The connecting device is a relatively rigid hoop which follows the contour of the ear 5 and which holds the first and second devices 22 and 23 in a relatively fixed position relative to each other.

Figure 2B:
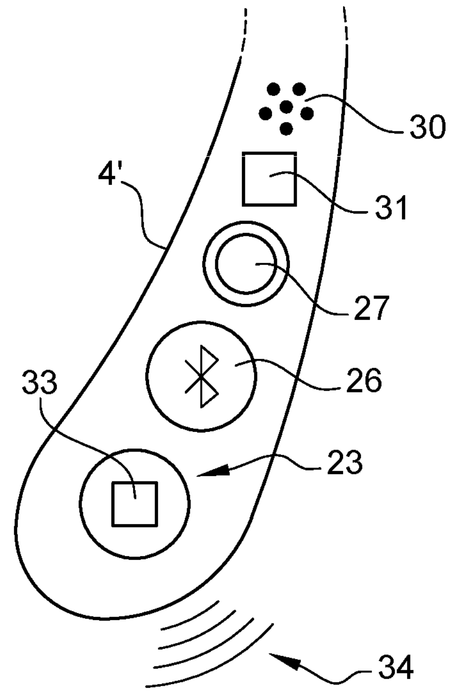
FIG. 2*b* represents a schematic front view of part of the hearing aid of FIG. 2*a*.

FIG. 2*b* illustrates an enlarged view of a first part 4' of the connecting device 4 in which the different elements making it possible to generate first vibrations are placed 34.

The connecting device 21 includes a first microphone 30, a processing module 32 comprising a microprocessor 31 and a first transducer 33. The connecting device 21 also includes a battery 27 making it possible to power the various aforementioned elements. The connecting device 21 also includes a wireless connection system 26 which can for example receive a secondary electrical signal coming from a mobile phone or a music player. This secondary electrical signal can be processed by the microprocessor 31 then be transmitted to the first and second transducers 33 and 33' and thus be transformed into first vibrations 34 and second vibrations 35.

According to this embodiment, the hearing aid includes only one of the following elements: microphone 30, microprocessor 32 and battery 27. However, according to a second possible embodiment, the hearing aid 21 can comprise each of these elements in duplicate, the second element of each being positioned in a second part of the connecting device 21, in the vicinity of the second bone conduction device 23.

Figure 3:
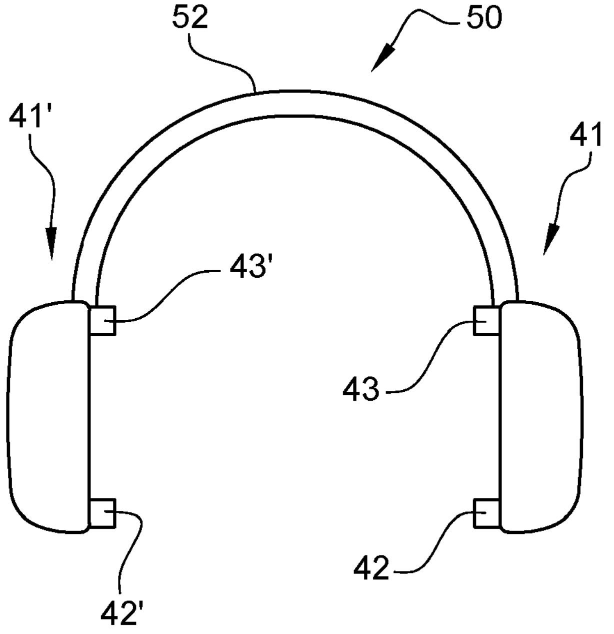
FIG. 3 represents a schematic front view of a hearing aid according to a third embodiment.

FIG. 3 illustrates a third embodiment of the invention. This embodiment relates to a hearing system 50 which comprises a first hearing aid 41 and a second hearing aid 41'. Each hearing aid 41 (41') includes a first bone conduction device 42 (42') and a second bone conduction device 43 (43').

Each hearing aid also includes the elements for receiving and processing the sound signal (microphone, microprocessor and transducer) as in the second embodiment which are placed in the holding system 52 taking the form of a headset.

This third embodiment can for example be used as noise-canceling headsets making it possible not to hear surrounding noises but making it possible to receive an electrical signal coming for example from a music player or the words of a third person by phone. This type of headset can be used for example by construction workers. According to this use, it is possible to process the sound signal in such a way that the noise is reduced or eliminated, and that the user can still hear the instructions of a person around them.

Figure 4:
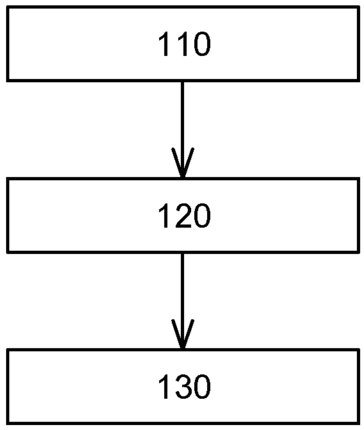
FIG. 4 illustrates a method for listening to a surrounding sound signal using the hearing aid according to the first embodiment.

FIG. 4 illustrates a method 100 for listening to a surrounding sound signal by means of the hearing aid 1. This method includes:

- a step 120 of positioning the first bone conduction device 2 in contact with a first bone area of the user's head;
- a step 120 of positioning the second bone conduction device 3 in contact with a second bone area of the user's head, the second bone area being different from the first bone area, and the first and second bone areas being located around the same ear;
- a step 130 of transmitting first vibrations 14 from the first device 2 and second vibrations 15 from the second device 3 so as to stimulate the auditory nerve 20 of said ear.

This method makes it possible to position the first and second bone conduction devices in a personalized manner for each user so as to be able to adapt the positioning to the morphology of the user and thus be able to stimulate the auditory nerve optimally. The user can thus obtain a faithful and complete reproduction of the surrounding sound.

The invention claimed is:

1. A hearing aid intended to be disposed around a user's ear comprising at least a first bone conduction device and at least a second bone conduction device, the first bone conduction device configured to be positioned in contact with a first bone area of a user's head and to transmit first vibrations to said first bone area, and the second bone conduction device configured to be positioned in contact with a second area of the user's head and to transmit second vibrations to said second bone area, said second bone area being different from the first bone area, and said first bone area and said second bone area being located around the same ear of the user, said hearing aid further comprising at least one microphone making it possible to capture a surrounding sound signal which is then transformed to generate the first and second vibrations, the first and second bone conduction device each comprising a main body, a base configured to be placed on the skin of the user, and an intermediate part which connects the main body and the base so that the base is able to move relative to the main body in order to generate the vibrations and to transmit said vibrations to the user.

2. The hearing aid according to claim 1, wherein the hearing aid comprises at least two microphones.

3. The hearing aid according to claim 1, wherein the first bone conduction device comprises a first transducer and the second bone conduction device comprises a second transducer, and wherein the first and second transducers are configured transform an electrical signal coming from the sound signal into first and second acoustic vibrations, respectively.

4. The hearing aid according to claim 1, wherein the at least one microphone is configured to generate at least one electrical signal from said at least one sound signal and a processing module configured to process said at least one electrical signal.

5. The hearing aid according to claim 1, wherein the first and second bone conduction devices are positioned on the user's skin and wherein the hearing aid includes a system for holding the first and second bone conduction devices on the skin.

6. The hearing aid according to claim 1, further comprising a connecting device configured to connect the first and second bone conduction devices to each other.

7. The hearing aid according to claim 1, wherein the hearing aid comprises at least one electrical signal receiver.

8. A method for listening to a surrounding sound signal by means of the hearing aid according to claim 1, said method comprising:

- positioning the first bone conduction device in contact with the first bone area of the user's head,
- positioning the second bone conduction device in contact with the second bone area of the user's head, the second bone area being different from the first bone area, and the first and second bone areas being located around the same ear, transmitting first vibrations from the first device and second vibrations from the second device, so as to stimulate the auditory nerve of said ear.

9. The method according to claim 8, wherein the first bone conduction device is positioned behind the ear and the second bone conduction device is positioned in front of the ear so that the first vibrations reach a central area of the auditory nerve and that the second vibrations reach a peripheral area of the auditory nerve.

10. The method according to claim 8, wherein at least one of the first or the second bone areas is chosen so as to be able to transmit the determined frequency ranges to the user.

11. The method according to claim 8, wherein the first device is positioned in contact with the mastoid process of the temporal bone.

12. The method according to claim 8, wherein the second device is positioned in contact with the temporal bone and/or the mandible.

13. A hearing system, comprising a first hearing aid and a second hearing aid according to claim 1, wherein the first hearing aid is configured to be positioned around an ear of the user and the second hearing aid is configured to be positioned around the other ear of said user.

14. The hearing system according to claim 13 for use in the treatment of hearing impairment and deafness.

15. The hearing system according to claim 13 for use in the treatment of at least one pathology selected from the group consisting of congenital or acquired pathologies of deafness or hearing impairment such as mixed pathologies, transmission pathologies, aplasia, absence of an ear canal, altitude, diving, decompression accidents, ear infections, viruses, unilateral cophosis, neurosensory pathologies, presbycusis, cases of neuromas and acoustic blast.

16. The hearing aid according to claim 1 for use in the treatment of the hearing impairment and deafness.

17. The hearing aid according to claim 1 for use in the treatment of at least one pathology selected from the group consisting of congenital or acquired pathologies of deafness or hearing impairment such as mixed pathologies, transmission pathologies, aplasia, absence of an ear canal, altitude, diving, decompression accidents, ear infections, viruses, unilateral cophosis, neurosensory pathologies, presbycusis, cases of neuromas and acoustic blast.

18. The hearing aid according to claim 1, further comprising a holding system configured to maintain the base in contact with the user's skin.

19. The hearing aid according to claim 1, wherein the first and second bone conduction device are each able to generate and transmit independently any range of frequency comprised between 20 Hz to 20 kHz.

20. The hearing aid according to claim 1, further comprising a central unit comprising the microphone and a processing module configured to process the electrical signal coming from the microphone.

* * * * *